L. D. Gale.
Illuminating Gas App.
No 3873.
Reissued Mch 8. 1870.
Fig. 1.
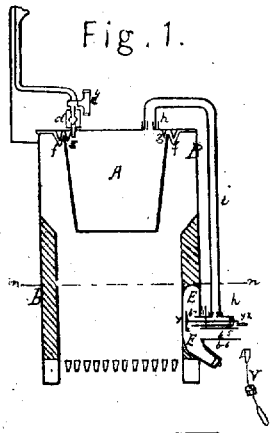
Fig. 2.
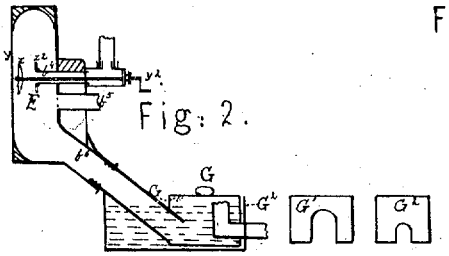
Fig. 8.
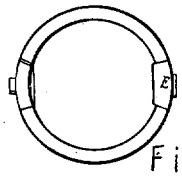
Fig. 10.
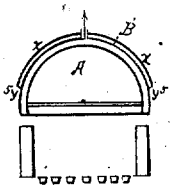
Fig. 3.
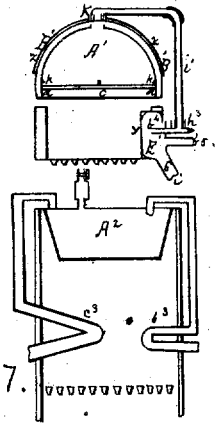
Fig. 7.
Fig. 4.
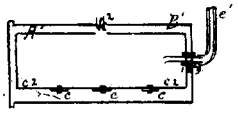
Fig. 5.
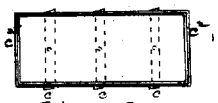
Fig. 6.
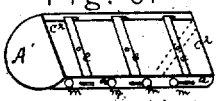
Fig. 11.
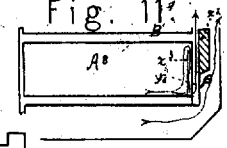
Fig. 9.
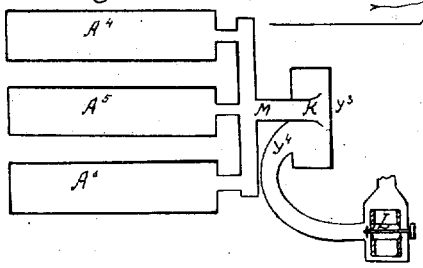
Witnesses.
Edwd. P. Brown
J. H. Merrill
Inventor.
L. D. Gale

UNITED STATES PATENT OFFICE.

WILLIAM J. NICHOLS AND ALONZO C. RAND, OF NEW YORK, N. Y., ASSIGNEES, BY MESNE ASSIGNMENTS, OF L. D. GALE, ASSIGNORS TO WILLIAM J. NICHOLS, ALDEN B. RAND, AND RICHARD H. BROWN, OF SAME PLACE.

IMPROVEMENT IN THE MANUFACTURE OF GAS.

Specification forming part of Letters Patent No. 26,030, dated November 8, 1859; reissue No. 3,873, dated March 8, 1870.

*To all whom it may concern:*

Be it known that LEONARD D. GALE, of the city and county of Washington, in the District of Columbia, invented a new and Improved Method of Treating Solid and Liquid Hydrocarbons, using them as liquid or solid feed, in the manner hereinafter specified, or using any of the equivalents of these substances for converting them into illuminating gas; and that the following is a full and exact description thereof, reference being had to the accompanying drawings and references marked thereon, which constitute a part of this specification.

The nature of the invention consists in treating any of the above-named substances, or their equivalents, and in fact all gas-illuminating materials, by first converting them into vapor and then forcing their vapor into contact with a red-hot surface, substantially as hereinafter described. This involves two distinct and separate processes. The first requires only so much heat as will vaporize the materials without converting them into a permanent gas. It is, therefore, below a cherry red, and may be in the range of 500° to 800° Fahrenheit. The second part of the process transfers the vapor when generated to the decomposing-chamber, forcing it by the *vis a tergo* in contact with or against a cherry red-hot surface of iron or other material, by which the vapor is decomposed into permanent gas.

No permanent gas can be formed in the first part of the process, and in the second none of the vapor can escape being converted to a permanent illuminating gas except by derangement of the functions of the apparatus.

In the common methods described for making illuminating gas the effect has been to convert the gas-making material, whatever it be, as quickly as possible directly to a permanent gas by heating the crude material at once to a cherry-red heat, so that it may be decomposed into vapor and into gas at the same instant, without recognizing the intermediate or vapor state.

In this method the gas-making material is first separated, taking from the crude, solid, or liquid matter all that is capable of being converted to gas, and retaining it in a uniform state of vapor till it is ready to be discharged into the decomposing-chamber, where it deposits a little carbon and becomes a permanent gas. As the vapor all passes through the decomposing-chamber, which is sustained at a cherry-red heat, no part can escape decomposition into gas, and therefore there can be no appreciable amount of gas-tar. This view is substantiated by experiment.

In the ordinary mode of generating coal-gas for our cities in the D-form retorts it is only the outer portion of the coal that is heated to redness; the interior parts being generally below that temperature are only vaporized without ever being converted to permanent gas. Consequently, when the product is cooled down the vapor is deposited as coal-tar.

From the above remarks it is quite evident that this process may be illustrated by a variety of different apparatus. It is only necessary to have one vessel to be heated at a little above the temperature of boiling oil, or to a temperature less than a red heat, controllable within that range, and a second vessel or chamber that shall be kept at a cherry-red heat.

In the accompanying drawings, Figure 1 represents a sectional elevation of a gas-stove, in which A is the vapor-generator, and E the gas-generating chamber. Fig. 2 is an enlarged view of the gas-making chamber. Fig. 3 is a sectional end view of a double retort and gas-back. Fig. 4 is a longitudinal sectional elevation of the retort, showing the mode of supplying it with liquid feed. Fig. 5 shows the movable bottom of the inner retort. Fig. 6 shows a bottom view of the inner retort and the supporting-braces *c c c*. It also exhibits vapor-holes *m*, &c., which are sometimes used when the gas-back is dispensed with.

Besides the above forms of retort there is a variety of modifications that may be used; one of these is seen in Fig. 7, where the U-form tube $c^3$ or $b^3$ is used as the decomposing-chamber; but the objection to this is that the tube is liable to clog with a deposit of charcoal.

Fig. 9 exhibits several retorts, $A^4$ $A^5$ $A^6$, in a single bench for converting the gas-fuel to vapor, the product being there forced into a decomposing-box, K, or into a gas-back, seen in Figs. 1, 2, and 3, designed to be used when large quantities of gas are manufactured. $Y^3$ is the red-hot surface. The reason for using the double retort instead of a single one is that the heat of the inner retort is more controllable. It is indispensable that the heat be not so high as a red heat. If it were a single retort, some part of it might and probably would be heated to redness now and then, which would be fatal to this process. If the single retort could be certainly kept at a heat below redness, then it is in some respects preferable to the double one. These retorts for converting vaporizable gas-fuel into vapor may be made very large so as to contain several tons of material at a time, and discharge their vapor into a very large decomposing-chamber having a suitable capacity to convert the whole material to permanent gas as fast as generated. It is proper to say that the kettle-retort A is more especially adapted to liquid fuel of all kinds, and the double retort is adapted to wood and all solid gas-fuel, though it can be used for liquid fuel.

In all the drawings similar letters and figures refer to the same devices.

B B is an ordinary cylinder sheet-iron stove lined with fire-brick, except a small space on one side, where the fire-brick has its place supplied by a hollow casting of iron, E. The retort A is chiefly designed to be supplied with fluid-feed from the reservoir *e*, controlled by the stop-cock *c*, which discharges its feed drop by drop through the tube *d*; or it may be filled with hydrocarbon liquid without being fed in drop by drop. *d* is the metallic tube containing two diamond holes on opposite sides, and having an inner glass tube cemented in it by plaster of Paris. By looking directly through the holes the rapidity of the drop can be seen. *f* is a circular channel in the retort-rim for holding fusible metal, made of a mixture of eight parts by weight of bismuth, five of lead, and three of tin, which melts at the heat of boiling water; but pure tin will answer the purpose. This melts at about 440°, and the cover of the retort is generally hot enough to keep the metal in a liquid state. *g g* are flanges projecting from the under side of the cover to prevent the vapor condensed on the same from being drawn up into the metal joints and so getting on the outside. *h'* is also a cup-metal joint, shown in section. *i* is an iron pipe for conveying the vapor from A to E. *h*, a cup-joint of the alloy aforesaid. *b''* is an iron pipe projecting half way through the chamber E, and discharges the vapor with considerable force against the red-hot surface Y of the gas-back E E. $b^5$ is the tube for discharging the illuminating gas formed in the chamber E. *z* is a rotary scraping-blade, designed to clear off the carbon deposited on plate *y*; and $y^2$ is the crank by which it is worked; and when not worked, the shaft, which is surrounded by an air-tight collar, is drawn back so that the sharp edge of the blade rests against the end of the tube $b^4$. Pipe $b^5$ should be a third larger than $b^4$. As a substitute for the rotary shaft and scraping-blade, a rod, V, and hand-scraper are inserted in the opening $b^6$ and worked through an air-tight collar. The scraper should be worked every two hours to insure no incrustation. The charcoal is withdrawn through pipe $b^6$. A top-view of the gas-back is seen in Fig. 8, occupying the place of one of the fire-bricks, a convenient position to sustain the inner plate at a constant red heat. The gas-back E E constitutes a distinguishing feature of this discovery and invention, which is, that any suitable hydrocarbon vapor generated at a temperature below a red heat, on being projected against a red-hot surface and instantaneously withdrawn therefrom is converted into an illuminating gas of a superior quality, and at the same time produces little or no gas-tar.

The operation is as follows: A fire of hard coal, coke, or hard wood is built on the grate till plate Y is at a cherry-red heat, when kettle A will be hot enough to distil any fatty or resinous body or woody fiber. As the apparatus is designed for liquid fuel, which is charged in the reservoir, the feed is let on by carefully opening the stop-cock $c^4$ till the feed drops with a rapid succession of drops, and the vapor generated passes through tube *i* and against plate Y, and, after becoming permanent gas, passes out through pipe $b^5$, and after going through condensing pipes is conducted to the gasometer, unless purification be necessary, in which case the usual processes are used. If wood be used as the gas-fuel, then the D-retort, Fig. 3, is the best adapted for the purpose. The mouth and fastening of the retort are constructed in the usual way, and not described here. The inner retort, made of thin cast-iron, or Russia sheet-iron where it is only about two and a half feet long, and ten to twelve inches wide, and nine to ten inches high, is laid on its back, as in Fig. 6, and the braces *c* unlocked by partially rotating them on their centers, and the bottom removed and the retort charged with wood, the bottom replaced and keyed down; the retort is then set upright and shoved into the outer retort and the door closed. If the fire be now raised the gas will come over in a few minutes, or as soon as the retort can be heated to the requisite temperature, which is a low red heat. It is recommended that as soon as the outer retort shows signs of incipient red heat and the gas-back is full cherry-red hot, then is the time to put in the inner retort, and close up the door as soon as possible. The joining of this retort is usually made air-tight by luting the rim of the door with clay and screwing it fast against the end of the retort. The same gas-back used with the kettle-retort is used with the D-retort, but the size of the gas-back must increase with the size of the retort. And it must be borne in mind that in charging the retort with separate charges put in at intervals, as wood and coal, and peat, and coal-slate, the gas comes over with a rush, and then diminishes, so as to make the pressure upon the internal part of the retort and gas-back very unequal, and consequently the jet through pipe $b^4$, and against plate Y, will also be different at different stages in working off the charge. This irregularity is corrected by making plate Y and chamber E sufficiently large to decompose all the vapor supplied when the current is the strongest. And if at any time it be ascertained that vapor still escapes in the glass tube $b^5$ and is deposited as coal-tar, the remedy is to screw further in pipe $b^4$, so that the hollow disk $z^2$ shall be brought nearer the decomposing-plate Y, so as to insure the bringing of all the current of vapor within the sphere of a red heat.

In the manufacture of wood-gas in domestic apparatus, where there is difficulty in equalizing the pressure in the gas-back, I have dispensed with the gas-back altogether, using in place of it the space on each side between the inner and the outer retort. This is done by making a sufficient number of holes, *m*, along (see Fig. 6) the sides of the inner retort and near its bottom, through which the vapor generated within is discharged against the red-hot sides of the outer retort; thence upward between the two retorts, and out by the aperture at $k^2$. In this case, where the gas-back is dispensed with, the aperture in the dome of the inner retort is closed and holes *m* substituted therefor; and the upper part of the outer retort is prevented from being heated red hot by the dome-shield piece *x x*, which may be of brick-work or of iron.

It should be remarked in this connection that the modification last described requires a greater amount of heat than that where the gas-back is used, inasmuch as the bottom and a part of the sides must be maintained at a full red heat. All the remarks applicable to this modification apply equally to coal-gas and gas from any solid substances. This modification is also seen in Fig. 10, where the vapor generated in $A^7$ passes out in the direction of the arrows, first in contact with red-hot plate $Y^5$, which converts it into gas, and thence out through the top of the dome, which dome is protected from being heated to redness by shield *x*, the part $Y^5$ being fully exposed to the flue, while all above is not so exposed. Fig. 11 shows another modification of the apparatus last named, where the vapor generated in $A^8$ passes out over plate $x^3$ through a horizontal slot in end plate of the inner retort, and strikes against red-hot plate $Y^6$, and escapes through the top in the direction of the arrow. The other arrow pursues the course of the fire-flue.

In case of using liquids as feed which are liable to froth up, such as crude-coal distillates, or other bituminous liquids, which may perchance overflow into the gas-back and clog-pipe $b^5$, I dispense with the use of $b^5$ as a gas-discharge, and allow the gas, as well as the drip, to pass out together through $b^6$ and the condenser to the gasometer. The advantage of this use of $b^6$ is a more capacious discharge-opening for the gas and the solid and liquid refuse all in one vessel—that is to say, the gas and the vapor and other refuse are passed out through the drip and washing apparatus E, Fig. 2, and thence to the gasometer.

Of the various forms of retort for working our process described above, that shown in Figs. 10 or 11 is regarded as best for efficiency and cheapness. That in Fig. 1 does its work well, and is useful for working very small quantities. The gas it makes is of superior quality.

Having thus fully described the invention, what is claimed as new, and desired to be secured by Letters Patent, is—

The treatment of all solid and liquid hydrocarbons by first converting the volatile portions to vapor at a temperature below a cherry-red heat, and forcing the vapor so generated into contact with a red-hot surface, and instantaneously removing the gas thus generated to prevent destructive decomposition, and thus form a permanent or fixed gas.

In testimony that we claim the above we have hereunto set our hands this 16th day of February, 1870.

WILLIAM J. NICHOLS.
A. C. RAND.

Witnesses:
J. M. MASON,
C. M. ALEXANDER.